（12) United States Patent
Ollila

(10) Patent No.: US 11,871,133 B2
(45) Date of Patent: Jan. 9, 2024

(54) GAZE-BASED NON-REGULAR SUBSAMPLING OF SENSOR PIXELS

(71) Applicant: VARJO TECHNOLOGIES OY, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 1 day.

(21) Appl. No.: 17/490,628

(22) Filed: Sep. 30, 2021

(65) Prior Publication Data
US 2023/0095462 A1  Mar. 30, 2023

(51) Int. Cl.
*H04N 25/75* (2023.01)
*H04N 25/40* (2023.01)
*G06F 3/01* (2006.01)

(52) U.S. Cl.
CPC ............. *H04N 25/75* (2023.01); *G06F 3/013* (2013.01); *G06F 3/014* (2013.01); *H04N 25/40* (2023.01)

(58) Field of Classification Search
CPC .......... H04N 1/00822; H04N 1/40068; H04N 21/4728; H04N 25/40; H04N 25/75; G02B 27/01; G02B 27/017; G02B 27/0179; G02B 2027/0187; G06F 3/013; G06F 3/014; G06K 15/1873; G06T 3/4007; G06T 5/005
See application file for complete search history.

(56) References Cited

U.S. PATENT DOCUMENTS

| 6,839,452 B1 | 1/2005 | Yang et al. | |
| 2013/0070109 A1* | 3/2013 | Gove | H04N 25/46 348/207.1 |
| 2019/0043167 A1* | 2/2019 | Steyskal | G06T 3/4038 |
| 2019/0331919 A1* | 10/2019 | Huo | G02B 27/017 |
| 2020/0074589 A1 | 3/2020 | Stent et al. | |
| 2020/0412983 A1* | 12/2020 | Nakata | G06T 7/70 |
| 2021/0243384 A1 | 8/2021 | Ollila | |

OTHER PUBLICATIONS

International Search Report and Written Opinion, Application No. PCT/FI2022/050561, dated Dec. 8, 2022, 13 pages.

* cited by examiner

*Primary Examiner* — Lin Ye
*Assistant Examiner* — Chriss S Yoder, III
(74) *Attorney, Agent, or Firm* — Ziegler IP Law Group

(57) ABSTRACT

An imaging system including: image sensor including pixels arranged on photo-sensitive surface; and processor configured to: obtain information indicative of gaze direction of user's eye; identify gaze position on photo-sensitive surface; determine first region and second region on photo-sensitive surface, wherein first region includes and surrounds gaze position, while second region surrounds first region; read out first pixel data from each pixel of first region; select set of pixels to be read out from second region based on predetermined sub-sampling pattern; read out second pixel data from pixels of selected set; generate, from second pixel data, pixel data of remaining pixels of second region; and process first pixel data, second pixel data, and generated pixel data to generate image frame(s).

31 Claims, 8 Drawing Sheets

P1    P2    P3    P4

P5    P6    P7    P8

GAZE-BASED NON-REGULAR SUBSAMPLING OF SENSOR PIXELS

TECHNICAL FIELD

The present disclosure relates to imaging systems incorporating gaze-based non-regular subsampling of sensor pixels. The present disclosure also relates to display apparatuses incorporating gaze-based non-regular subsampling of sensor pixels. The present disclosure also related to methods for gaze-based non-regular subsampling of sensor pixels.

BACKGROUND

Nowadays, with an increase in the number of images being captured every day, there is an increased demand for developments in image processing. For example, such a demand may be quite high and critical in case of evolving technologies such as immersive extended-reality (XR) technologies which are being employed in various fields such as entertainment, real estate, training, medical imaging operations, simulators, navigation, and the like. Several advancements are being made to develop image processing technology.

However, existing image processing technology has several limitations associated therewith. Firstly, the existing image processing technology processes image signals captured by pixels of an image sensor of a camera in a manner that such processing requires considerable processing resources, involves a long processing time, requires high computing power, and limits a number of pixels that can be arranged on an image sensor for full pixel readout at a given frame rate. As an example, image signals corresponding to only about 9 million pixels on the image sensor may be processed currently (by full pixel readout) to generate image frames at 90 frames per second (FPS). Secondly, the existing image processing technology is unable to cope with visual quality requirements that arise, for example, due to high-resolution (such as a resolution higher than or equal to 60 pixels per degree), small pixel size, high field of view (FOV), and high frame-rate requirements (such as a frame rate higher than or equal to 90 FPS) in some display devices (such as XR devices). In an example, some XR devices may employ at least two cameras per eye to obtain images having a high FOV at a high frame rate. However, in such images, high resolution is obtained only in a narrow region, since focal lengths of optical elements of the at least two cameras are typically modified by distortion in order to obtain the high field of view. Resultantly, the generated images lack requisite visual quality, thereby leading to a poor, non-immersive viewing experience for the user.

Therefore, in light of the foregoing discussion, there exists a need to overcome the aforementioned drawbacks associated with existing image processing technology.

SUMMARY

The present disclosure seeks to provide an imaging system incorporating gaze-based non-regular subsampling of sensor pixels. The present disclosure also seeks to provide a display apparatus incorporating gaze-based non-regular subsampling of sensor pixels. The present disclosure also seeks to provide a method for gaze-based non-regular subsampling of sensor pixels. An aim of the present disclosure is to provide a solution that overcomes at least partially the problems encountered in prior art.

In one aspect, an embodiment of the present disclosure provides an imaging system comprising:
  an image sensor comprising a plurality of pixels arranged on a photo-sensitive surface thereof; and
  a processor configured to:
    obtain information indicative of a gaze direction of a user's eye;
    identify a gaze position on the photo-sensitive surface of the image sensor, based on the gaze direction of the user's eye;
    determine a first region and a second region on the photo-sensitive surface of the image sensor based on the gaze position, wherein the first region includes and surrounds the gaze position, while the second region surrounds the first region;
    read out first pixel data from each pixel of the first region;
    select a set of pixels that are to be read out from the second region based on a predetermined sub-sampling pattern, wherein the predetermined sub-sampling pattern indicates locations of the pixels of the set;
    read out second pixel data from the pixels of the selected set;
    generate, from the second pixel data, pixel data of remaining pixels of the second region; and
    process the first pixel data, the second pixel data and the generated pixel data to generate at least one image frame.

In another aspect, an embodiment of the present disclosure provides a display apparatus comprising:
  gaze-tracking means;
  a light source per eye;
  an image sensor per eye comprising a plurality of pixels arranged on a photo-sensitive surface thereof; and
  at least one processor configured to:
    process gaze-tracking data, collected by the gaze-tracking means, to determine a gaze direction of a user's eye;
    identify a gaze position on the photo-sensitive surface of the image sensor, based on the gaze direction of the user's eye;
    determine a first region and a second region on the photo-sensitive surface of the image sensor based on the gaze position, wherein the first region includes and surrounds the gaze position, while the second region surrounds the first region;
    read out first pixel data from each pixel of the first region;
    select a set of pixels that are to be read out from the second region based on a predetermined sub-sampling pattern, wherein the predetermined sub-sampling pattern indicates locations of the pixels of the set;
    read out second pixel data from the pixels of the selected set;
    generate, from the second pixel data, pixel data of remaining pixels of the second region;
    process the first pixel data, the second pixel data and the generated pixel data to generate at least one image frame; and
    display the at least one image frame via the light source.

In yet another aspect, an embodiment of the present disclosure provides a method comprising:
  obtaining information indicative of a gaze direction of a user's eye;

identifying a gaze position on a photo-sensitive surface of an image sensor, based on the gaze direction of the user's eye;

determining a first region and a second region on the photo-sensitive surface of the image sensor based on the gaze position, wherein the first region includes and surrounds the gaze position, while the second region surrounds the first region;

reading out first pixel data from each pixel of the first region;

selecting a set of pixels that are to be read out from the second region based on a predetermined sub-sampling pattern, wherein the predetermined sub-sampling pattern indicates locations of the pixels of the set;

reading out second pixel data from the pixels of the selected set;

generating, from the second pixel data, pixel data of remaining pixels of the second region; and processing the first pixel data, the second pixel data and the generated pixel data to generate at least one image frame.

Embodiments of the present disclosure substantially eliminate or at least partially address the aforementioned problems in the prior art, and enable efficient gaze-based non-regular subsampling of sensor pixels to generate highly immersive and realistic image frames, in a manner that a high frame rate is obtained, and the processor is not excessively computationally overburdened.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates different regions on a photo-sensitive surface of an image sensor, while

Figure 1:
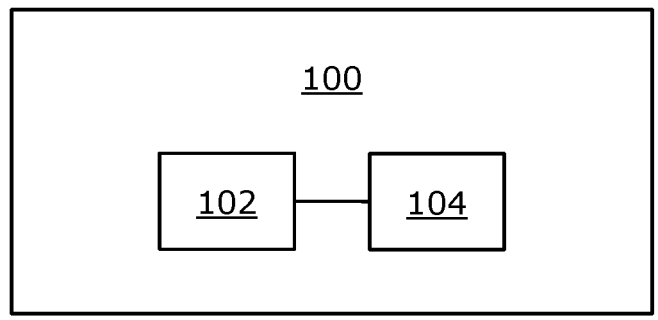
FIG. 1 illustrates a block diagram of an architecture of an imaging system, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
an image sensor comprising a plurality of pixels arranged on a photo-sensitive surface thereof; and
a processor configured to:
  obtain information indicative of a gaze direction of a user's eye;
  identify a gaze position on the photo-sensitive surface of the image sensor, based on the gaze direction of the user's eye;
  determine a first region and a second region on the photo-sensitive surface of the image sensor based on the gaze position, wherein the first region includes and surrounds the gaze position, while the second region surrounds the first region;
  read out first pixel data from each pixel of the first region;
  select a set of pixels that are to be read out from the second region based on a predetermined sub-sampling pattern, wherein the predetermined sub-sampling pattern indicates locations of the pixels of the set;
  read out second pixel data from the pixels of the selected set;
  generate, from the second pixel data, pixel data of remaining pixels of the second region; and
  process the first pixel data, the second pixel data and the generated pixel data to generate at least one image frame.

In another aspect, an embodiment of the present disclosure provides a display apparatus comprising:
gaze-tracking means;
a light source per eye;
an image sensor per eye comprising a plurality of pixels arranged on a photo-sensitive surface thereof; and
at least one processor configured to:

process gaze-tracking data, collected by the gaze-tracking means, to determine a gaze direction of a user's eye;
identify a gaze position on the photo-sensitive surface of the image sensor, based on the gaze direction of the user's eye;
determine a first region and a second region on the photo-sensitive surface of the image sensor based on the gaze position, wherein the first region includes and surrounds the gaze position, while the second region surrounds the first region;
read out first pixel data from each pixel of the first region;
select a set of pixels that are to be read out from the second region based on a predetermined sub-sampling pattern, wherein the predetermined sub-sampling pattern indicates locations of the pixels of the set;
read out second pixel data from the pixels of the selected set;
generate, from the second pixel data, pixel data of remaining pixels of the second region;
process the first pixel data, the second pixel data and the generated pixel data to generate at least one image frame; and
display the at least one image frame via the light source.

In yet another aspect, an embodiment of the present disclosure provides a method comprising:
obtaining information indicative of a gaze direction of a user's eye;
identifying a gaze position on a photo-sensitive surface of an image sensor, based on the gaze direction of the user's eye;
determining a first region and a second region on the photo-sensitive surface of the image sensor based on the gaze position, wherein the first region includes and surrounds the gaze position, while the second region surrounds the first region;
reading out first pixel data from each pixel of the first region;
selecting a set of pixels that are to be read out from the second region based on a predetermined sub-sampling pattern, wherein the predetermined sub-sampling pattern indicates locations of the pixels of the set;
reading out second pixel data from the pixels of the selected set;
generating, from the second pixel data, pixel data of remaining pixels of the second region; and
processing the first pixel data, the second pixel data and the generated pixel data to generate at least one image frame.

The present disclosure provides the aforementioned imaging system, the aforementioned display apparatus, and the aforementioned method. Herein, pixel data from the plurality of pixels arranged on the photo-sensitive surface is selectively (i.e., customisably) read out, based on gaze direction of the user's eye. The pixel data from all the pixels lying in the first region is read out to provide a high resolution in a corresponding first portion of the at least one image frame, whereas the pixel data from the pixels lying in the second region is selectively read out based on the predetermined sub-sampling pattern, and then un-read pixel data is generated. This produces a relatively lower resolution in a corresponding second portion of the at least one image frame. This variation in resolution mimics human eye viewing characteristics. Different pixel data are processed in a manner that the processor overburdening, delays, and excessive power consumption do not occur during said processing. In this regard, conservation and utilization of processing resources of the processor is optimized. Furthermore, the processor effectively copes with visual quality requirements of various display apparatuses, to generate the at least one image frame with a requisite visual quality. The processor can be judiciously used to also perform other processing tasks, if required. A selective read out of the pixel data in the second region also facilitates in providing a high frame rate of image frames. This facilitates an increase in overall efficiency of the processor, and makes the imaging system suitable for use with demanding applications (such as extended-reality applications). Moreover, the imaging system can easily employ a single camera per eye to obtain high, spatially-varying image quality of the at least one image frame that emulates image viewing quality and characteristics of human visual system. The method is fast, effective, reliable and can be implemented with ease.

The imaging system comprises specialized equipment for generating the at least one image frame which is subsequently displayed at the display apparatus. It will be appreciated that the imaging system generates the image frame(s) in real time or near-real time. Then, the at least one image frame is communicated from the imaging system to the display apparatus. The at least one image frame is to be presented to a user of the display apparatus.

Throughout the present disclosure, the term "image frame" refers to visual content, which encompasses not only colour information represented in the at least one image frame, but also other attributes associated with the at least one image frame (for example, such as depth information, transparency information, luminance information, and the like). It will be appreciated that the at least one image frame represents a real-world scene of a real-world environment. At the display apparatus, the at least one image frame could be utilized to generate a visual scene of an extended-reality (XR) environment. The term "extended-reality" encompasses virtual reality (VR), augmented reality (AR), mixed reality (MR), and the like.

The imaging system is communicably coupled with the display apparatus wirelessly and/or in a wired manner. The term "display apparatus" refers to a specialized equipment that is capable of at least displaying the at least one image frame. Optionally, the at least one processor (of the display apparatus) is configured to: superimpose virtual content upon the at least one image frame to generate at least one XR image frame; and display the at least one XR image frame via the light source. Alternatively, optionally, the processor (of the imaging system) is configured to superimpose the virtual content on the at least one image frame, prior to sending it to the display apparatus. Optionally, the display apparatus is implemented as a head-mounted display (HMD). The term "head-mounted display" refers to specialized equipment that is configured to present the XR environment to the user when said HMD, in operation, is worn by the user on his/her head. The HMD is implemented, for example, as an XR headset, a pair of XR glasses, and the like, that is operable to display the visual scene of the XR environment to the user.

In some implementations, the imaging system is optionally integrated with the display apparatus. In such implementations, the imaging system is physically coupled to the display apparatus (for example, attached via mechanical and/or electrical connections to components of the display apparatus). For example, the image sensor may be arranged on an outer surface of the display apparatus that faces the real-world environment. Optionally, in such implementations, the processor of the imaging system is implemented as the at least one processor of the display apparatus. Alternatively, optionally, in such implementations, the processor of the imaging system is communicably coupled to the at least one processor of the display apparatus.

In other implementations, the imaging system is optionally implemented on a remote device that is separate from the display apparatus. In such implementations, the processor of the imaging system is communicably coupled to the at least one processor of the display apparatus wirelessly and/or in a wired manner. Optionally, the imaging system is mounted on the remote device. Examples of the remote device include, but are not limited to, a drone, a vehicle, and a robot. Optionally, the remote device is physically positioned in the real-world environment, whereas the user of the display apparatus is positioned away from (for example, at a distance from) the remote device.

In yet other implementations, the imaging system is optionally arranged at a given location within the real-world environment. For example, the imaging system may be arranged on a support structure and may be capable of a three-dimensional (3D) rotation (and additionally, capable of a translation motion). Herein, the support structure can be moved to any required location in the real-world environment.

Throughout the present disclosure, the term "image sensor" refers to a device that detects light from the real-world environment at its photo-sensitive surface, thereby enabling the plurality of pixels arranged on the photo-sensitive surface to capture a plurality of image signals. The plurality of image signals are electrical signals pertaining to the real-world scene of the real-world environment. The plurality of image signals constitute captured pixel data of the plurality of pixels. Examples of the image sensor include, but are not limited to, a charge-coupled device (CCD) image sensor, and a complementary metal-oxide-semiconductor (CMOS) image sensor. It will be appreciated that the plurality of pixels could be arranged in a required manner (for example, such as a rectangular two-dimensional (2D) grid, a polygonal arrangement, a circular arrangement, an elliptical arrangement, a freeform arrangement, and the like) on the photo-sensitive surface of the image sensor. In a first example, the image sensor may comprise 25 megapixels arranged in the rectangular 2D grid (such as a 5000×5000 grid) on the photo-sensitive surface.

It will be appreciated that the image sensor is a part of at least one camera. The processor of the imaging system may also be a part of the at least one camera. The at least one camera could be arranged anywhere in the real-world environment where the user is present, or could be arranged on the remote device present in the real-world environment, or could be arranged on the display apparatus worn by the user on his/her head. Optionally, the at least one camera is implemented as at least one visible light camera. Examples of a given visible light camera include, but are not limited to, a Red-Green-Blue (RGB) camera, a Red-Green-Blue-Alpha (RGB-A) camera, a monochrome camera, a Red-Green-Green-Blue (RGGB) camera, a Red-Yellow-Yellow-Blue (RYYB) camera, a Red-Clear-Clear-Blue (RCCB) camera, a Red-Green-Blue-Infrared (RGB-IR) camera. As an example, the RGB-IR camera can be a 2×2 pattern-based RGB-IR camera, a 4×4 pattern-based RGB-IR camera, or similar. It will be appreciated that the at least one camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared camera. As an example, the at least one camera may be implemented as the stereo camera. As another example, the at least one camera may have an image sensor having 576 million pixels, wherein 2×2 grids, 3×3 grids or even 4×4 grids of pixels of a same colour can be binned to form a single super pixel. Such an implementation of the image sensor provides a native pixel resolution. The image sensor may, for example, have several QUAD/4C colour pixels in grids, wherein QUAD/4C colour pixels in each grid are to be binned to form a corresponding super pixel. Each grid of QUAD/4C colour pixels has four pixels of a same colour being arranged next to each other in a 2×2 manner, wherein these four pixels are binned to form a single super pixel of the same colour.

Notably, the processor controls overall operation of the imaging system. The processor is communicably coupled to the image sensor and to the display apparatus. Optionally, the processor of the imaging system is implemented as an image signal processor. In an example, the image signal processor may be a programmable digital signal processor (DSP). Alternatively, optionally, the processor is implemented via a cloud server that provides a cloud computing service.

Notably, the processor obtains, from the gaze-tracking means of the display apparatus, the information indicative of the gaze direction of the user's eye. The term "gaze direction" refers to a direction in which the user's eye is gazing. The gaze direction may be represented by a gaze vector. Throughout the present disclosure, the term "gaze-tracking means" refers to a specialized equipment for detecting and/or following gaze of the user's eye, when the display apparatus in operation is worn by the user on his/her head. The gaze-tracking means could be implemented as contact lenses with sensors, cameras monitoring a position of a pupil of the user's eye, and the like. Such gaze-tracking means are well-known in the art. Notably, the gaze-tracking means is configured to collect the gaze-tracking data, which constitutes the information indicative of the gaze direction of the user's eye. Said information may also include the gaze vector. Then, the gaze-tracking means optionally sends the gaze-tracking data (i.e., said information) to the processor. Optionally, the processor is configured to process the gaze-tracking data for determining the gaze direction of the user's eye. The gaze-tracking data may comprise images of the user's eye, sensor values, and the like. Optionally, when processing the gaze-tracking data, the processor is configured to employ at least one of: an image processing algorithm, a feature extraction algorithm, a data processing algorithm. It will be appreciated that the gaze-tracking data is collected repeatedly by the gaze-tracking means throughout a given session of using the display apparatus, as gaze of the user's eye keeps changing whilst he/she uses the display apparatus. An up-to-date gaze-tracking data (indicative of the gaze direction of the user's eye) allows for generating up-to-date gaze-contingent image frame(s).

In some implementations, the gaze direction is a current gaze direction. In other implementations, the gaze direction is a predicted gaze direction. In this regard, the at least one processor of the display apparatus predicts the gaze direction of the user's eye, and provides the predicted gaze direction of the user's eye to the processor of the imaging system. It will be appreciated that optionally the predicted gaze direction is predicted, based on a motion of the user's gaze, wherein the predicted gaze direction lies along a direction of the motion of the user's gaze. In such a case, the motion of the user's gaze could be determined in terms of velocity and/or acceleration of the user's gaze, using information indicative of previous gaze directions of the user's eye and/or the current gaze direction of the user's eye. In yet other implementations, the gaze direction is a default gaze direction, wherein the default gaze direction of the user is straight. In such a case, it is considered that a user's gaze is, by default, typically directed towards a centre of his/her field of view. In such a case, a central portion of the user's field of view is resolved to a much greater degree of visual detail, as compared to a peripheral portion of the user's field of view. A gaze position corresponding to the default gaze direction lies at a centre of the photo-sensitive surface.

Optionally, when identifying the gaze position on the photo-sensitive surface, the processor is configured to map the gaze direction of the user's eye onto the photo-sensitive surface. The term "gaze position" refers to a position on the photo-sensitive surface onto which the gaze direction is mapped. As an example, the gaze position may be at a centre of the photo-sensitive surface. As another example, the gaze position may be at a point in a top-left region of the photo-sensitive surface.

Notably, the first region and the second region are determined dynamically, based on the gaze position. In this regard, the first region corresponds to a gaze area (i.e., a region of interest), whereas the second region corresponds to a peripheral area surrounding the gaze area. Such a dynamic manner of determining the first region and the second region emulates a way in which the user actively focuses within his/her field of view. It will be appreciated that some pixels from amongst the plurality of pixels lie in the first region, while remaining pixels from amongst the plurality of pixels lie in the second region. Referring to the first example, when the gaze position is at a centre of the photo-sensitive surface, 1 megapixel (namely, 1 million pixels) arranged as a 1000× 1000 grid in a centre may lie in the first region, while remaining 24 megapixels may lie in the second region.

Optionally, an angular extent of the first region lies in a range of 0 degrees from the gaze position to 2-50 degrees from the gaze position, while an angular extent of the second region lies in a range of 12.5-50 degrees from the gaze position to 45-110 degrees from the gaze position. As an example, the angular extent of the first region may be from 0 degree to an angle that lies in a range of 2, 6, 10, 15, 20, 25 or 35 degrees up to 10, 20, 30, 40, 45 or 50 degrees from the gaze position, while the angular extent of the second region may be from an angle that lies in a range of 12.5, 15, 17.5, 20, 25, 30 or 35 degrees up to 20, 30, 35, 40, 45 or 50 degrees from the gaze position to an angle that lies in a range of 45, 50, 55, 60, 70, 80 or 90 degrees up to 60, 70, 80, 90, 95, 100, 105 or 110 degrees from the gaze position.

Notably, the processor reads out the first pixel data from each pixel of the first region, since the first region corresponds to the gaze area according to the gaze direction of the user's eye. When reading out the first pixel data, image signals captured by each pixel of first region are processed. As a result, the first pixel data enables in achieving a high visual quality (i.e., a native resolution) in corresponding gaze-contingent pixels of the at least one image frame. Referring to and continuing from the first example, the 1 megapixel arranged as the 1000×1000 grid are read out to constitute the first pixel data. Optionally, when the pixels are arranged in the rectangular 2D grid on the photo-sensitive surface, the processor is configured to read out a given pixel data from pixels of a given region in a line-by-line manner.

Throughout the present disclosure, the term "pixel data" refers to information pertaining to a given pixel of a given region, wherein said information comprises one or more of: a colour value of the given pixel, a depth value of the given pixel, a transparency value of the given pixel, a luminance value of the given pixel, and the like. Optionally, the given pixel data is in a form of a RAW image data. Alternatively, optionally, the given pixel data is in a form of a given colour space data. Optionally, in this regard, the processor is configured to generate the given colour space data from the RAW image data. Optionally, the given colour space is one of: a standard Red-Green-Blue (sRGB) colour space, an RGB colour space, a Luminance and two colour differences (YUV) colour space, a Hue-Chroma-Luminance (HCL) colour space, a Hue-Saturation-Lightness (HSL) colour space, a Hue-Saturation-Brightness (HSB) colour space, a Hue-Saturation-Value (HSV) colour space, a Hue-Saturation-Intensity (HSI) colour space, a Cyan-Magenta-Yellow-Black (CMYK) colour space, a blue-difference and red-difference chroma components (YCbCr) colour space. The RGB colour space is optionally transformed (namely, converted) to any of the aforesaid colour spaces.

Throughout the present disclosure, the term "predetermined sub-sampling pattern" refers to a software-based masking pattern that enables in selectively reading out pixels of the second region. In this regard, pixels of the second region whose locations are indicated in the predetermined sub-sampling pattern are selected in the set of pixels that are to be read out from the second region, while pixels of the second region whose locations are not indicated in the predetermined sub-sampling pattern are skipped and thus, are not read out from the second region. The predetermined sub-sampling pattern thus provides a predetermined, non-regular selection criterion for sub-sampling pixels of the second region. Referring to and continuing from the first example, the set of pixels that are to be read out from the second region may comprise 6 megapixels that are arranged in a non-regular manner across the second region.

Optionally, the predetermined sub-sampling pattern is a non-regular pattern. The "non-regular pattern" is a software-based masking pattern which indicates locations of irregularly-arranged (i.e., disorderly arranged) pixels in the second region. These irregularly-arranged pixels are selected as the set of pixels. Herein, the term "non-regular" indicates that pixels of the set are not selected according to any typical or standardised spatially-regular manner, but in fact are deliberately and carefully selected in a spatially-irregular manner so as to facilitate in accurately and reliably generating the pixel data of the remaining pixels of the second region. Moreover, the term "non-regular" does not imply that the pixels of the set are necessarily selected randomly, as random selection may lead to inconsistent sub-sampling in the second region (i.e., nil or extremely low sub-sampling in some areas of the second region and extremely high sub-sampling in some other areas of the second region).

Optionally, the non-regular pattern is generated in a manner that the non-regular pattern is free from at least one unfavourable pixel arrangement. Optionally, in this regard, the at least one unfavourable pixel arrangement is at least one of: a 1×2 or 2×1 grid of pixels to be read out, a 2×2 grid of pixels to be read out, a 2×4 or 4×2 grid of skipped pixels, an alternate arrangement of three pixels to be read out and two skipped pixels, a diagonal arrangement of three pixels to be read out, a zigzag arrangement of five pixels to be read out. Beneficially, when the at least one unfavourable pixel arrangement is minimized in the non-regular pattern, the pixels that are to be read out from the second region are optimally selected in the set. Furthermore, when the predetermined sub-sampling pattern is the non-regular pattern, undesirable visual artifacts (such as moiré effect) due to aliasing are reduced in the at least one image frame that is subsequently generated.

Optionally, the processor is configured to change the predetermined sub-sampling pattern from one image frame to another image frame. When the predetermined sub-sampling pattern is same for each image frame, the user (of the display apparatus) viewing a sequence of image frames may be able to perceive a same pattern of varying visual quality in the sequence of image frames, said pattern having a high-quality region (corresponding to the sampled pixels selected according to the predetermined sub-sampling pattern) and a low-quality region (corresponding to the skipped pixels according to the predetermined sub-sampling pattern). Therefore, the processor changes the predetermined sub-sampling pattern from one image frame to another image frame, such that visual quality in the sequence of image frames would vary differently, and such variation would be imperceptible to the user. This is because the set of pixels that are to be read out from the second region changes from one image frame to another image frame in a spatiotemporal manner. Furthermore, when the predetermined sub-sampling pattern is changed from one image frame to another image frame the undesirable visual artifacts due to the aliasing are considerably reduced in sequence of image frames.

Optionally, when changing the predetermined sub-sampling pattern from one image frame to another image frame, the processor is configured to employ, for a given image frame, a given predetermined sub-sampling pattern that is selected from amongst a plurality of predetermined sub-sampling patterns. Optionally, a number of the plurality of predetermined sub-sampling patterns is fixed, wherein the given predetermined sub-sampling pattern is employed in a cyclic manner for two or more image frames. Optionally, the number of the plurality of predetermined sub-sampling patterns lies in a range of 2 to 32. As an example, the number of the plurality of predetermined sub-sampling patterns may be from 2, 4, 9, 12, 16 or 25 up to 10, 16, 20, 25 or 32. In this regard, when a number of image frames exceeds the number of the plurality of predetermined sub-sampling patterns, the processor employs one predetermined sub-sampling pattern for one image frame until all predetermined sub-sampling patterns are employed once, and then re-employ the (same) plurality of predetermined sub-sampling patterns for subsequent image frames in the cyclic manner. In an example, the processor may employ 8 predetermined sub-sampling patterns P1, P2, P3, P4, P5, P6, P7, and P8 for 12 image frames F1, F2, F3, F4, F5, F6, F7, F8, F9, F10, F11, and F12. Herein, the processor may employ the predetermined sub-sampling patterns in a sequence: P1, P2, P3, P4, P5, P6, P7, P8, P1, P2, P3, P4 for the image frames F1, F1, F2, F3, F4, F5, F6, F7, F8, F9, F10, F11, F12, respectively.

Optionally, a sub-sampling density of the predetermined sub-sampling pattern varies across the second region as a function of a distance from the gaze position. The term "sub-sampling density" refers to a number of pixels that are to be read out (namely, sampled) from the second region per unit area. In this regard, said area may be expressed in terms of a total number of pixels, a number of pixels in both horizontal and vertical dimensions, units of length, or similar. For example, the sub-sampling density may be 2 pixels per 10 pixels, 4 pixels per 4×4 grid of pixels, 5 pixels per 50 square micrometres of the image sensor, or similar. Optionally, the function of the distance from the gaze position is one of: a linear function, a non-linear function, a step-wise function. It will be appreciated that the sub-sampling density reduces across the second region as the distance from the gaze position increases (i.e., the sub-sampling density across the second region is higher near an inner periphery of the second region as compared to an outer periphery of the second region). Thus, the number of pixels that are to be read out from the second region per unit area increase on going from the outer periphery of the second region towards the inner periphery of the second region (i.e., the sub-sampling density is spatially dense near the inner periphery of the second region and is spatially sparse near the outer periphery of the second region). This is because the pixels of the second region lying near the gaze position would be perceived in the at least one image frame with high visual acuity by foveas of the user's eye, as compared to the pixels of the second region lying far from the gaze position. Therefore, a higher sub-sampling density is required near the gaze position for accurately and reliably generating pixel data of the remaining pixels lying near the gaze position, using pixel data of the (read out) pixels lying near the gaze position, to produce a higher resolution.

In an example implementation, the predetermined sub-sampling pattern changes from one image frame to another image frame and, for each image frame, the sub-sampling density of its corresponding predetermined sub-sampling pattern varies across the second region as the function of the distance from the gaze position. It will also be appreciated that when the sub-sampling density reduces across the second region on increase in the distance from the gaze position, a binning ratio (i.e., a number of pixels binned into a pixel that is sampled) and a pixel-skipping ratio (i.e., a ratio of a number of skipped pixels and a number of pixels that are read out per unit area) in the second region also increases as the distance from the gaze position increases. In an example, the binning ratio near the outer periphery of the second region may be 16:1, 12:1, 9:1, 8:1, or similar, whereas the binning ratio near the inner periphery of the second region may be 6:1, 4:1, 2:1, or similar. The sampled pixel(s) and the pixels that are binned could be arranged as a 2×1 grid, a 2×2 grid, a 3×2 grid, a 3×3 grid, a 4×3 grid, a 4×4 grid or similar. Furthermore, a ratio of pixels of the second region for which pixel data is generated (i.e., hallucinated pixels) to pixels of the second region that are read out increases as the distance from the gaze position increases.

In an embodiment, the sub-sampling density is at least 25 percent. In this regard, the sub-sampling density may be 25 percent, 30 percent, 35 percent, 40, percent, 45 percent, 50 percent, 55 percent, 60 percent, and the like. In an example, when the sub-sampling density is at least 25 percent, at least 4 pixels may be read out from amongst every 16 pixels (of a 4×4 grid) of the second region. In another example, when the sub-sampling density is at least 50 percent, at least 2 pixels are to be read out from amongst every 4 pixels (of a 2×2 grid) of the second region. In an example implementation, the sub-sampling density may be 25 percent near the outer periphery of the second region and may be 50 percent near the inner periphery of the second region.

In another embodiment, the sub-sampling density is at most 25 percent. In this regard, the sub-sampling density may be 25 percent, 20 percent, 15 percent, 10 percent, 5 percent, and the like. In an example, when the sub-sampling density is 10 percent, 10 pixels may be read out from amongst every 100 pixels of the second region. In another example, when the sub-sampling density is 15 percent, only 15 pixels may be read out from amongst every 100 pixels of the second region. In an example implementation, the sub-sampling density may be 10 percent near the outer periphery of the second region and may be 25 percent near the inner periphery of the second region.

Optionally, the processor is configured to generate the predetermined sub-sampling pattern from a baseline sub-sampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from the outer periphery of the second region towards the inner periphery of the second region according to the function of the distance from the gaze position. The term "baseline sub-sampling pattern" refers to an initial sub-sampling pattern that is used to generate the predetermined sub-sampling pattern. Optionally, a size of the baseline sub-sampling pattern is same as a size of the predetermined sub-sampling pattern. It will be appreciated that the baseline sub-sampling pattern of a requisite size could be generated by repeating an M×N sub-sampling pattern of a smaller size, in at least one given direction. The M×N sub-sampling pattern could be, for example, a 4×2 sub-sampling pattern, an 8×8 sub-sampling pattern, a 10×10 sub-sampling pattern, a 16×12 sub-sampling pattern, a 32×32 sub-sampling pattern, or similar. The number of additional pixels to be included in the baseline set per unit area varies in the aforesaid manner because the pixels near the inner periphery of the second region would be perceived in the at least one image frame with high visual acuity, as compared to the pixels near the outer periphery of the second region. Therefore, a higher number of additional pixels per unit area are required to be included near a portion of the baseline sub-sampling pattern that corresponds to the inner periphery as compared to a portion of the baseline sub-sampling pattern that corresponds to the outer periphery. The predetermined sub-sampling pattern thus generated enables in performing spatially variable sub-sampling across the second region, in a manner that mimics how humans focus within their field of view. In this regard, the pixels near the inner periphery of the second region (i.e., gaze-proximal pixels) are sampled more than the pixels near the outer periphery of the second region.

Optionally, the baseline sub-sampling pattern indicates locations of green pixels, red pixels and blue pixels (namely, pixels that correspond to a green colour filter, a red colour filter and a blue colour filter, respectively) that are to be read out, wherein the baseline set includes the green pixels, the red pixels and the blue pixels in a ratio of 2:1:1. Moreover, optionally, the predetermined sub-sampling pattern indicates locations of green pixels, red pixels and blue pixels of the set that are to be read out from the second region, wherein said set includes the green pixels, the red pixels and the blue pixels in a ratio of 2:1:1.

Optionally, the image sensor comprises a Bayer colour filter arranged in front of the plurality of pixels of the image sensor. When the plurality of pixels of the image sensor are arranged in a rectangular 2D grid, the Bayer colour filter may have an alternate arrangement of red colour filters and green colour filters for odd rows of the rectangular 2D grid, and an alternate arrangement of green colour filters and blue colour filters for even rows of the rectangular 2D grid. The Bayer colour filter is well-known in the art. It will be appreciated that when the aforesaid baseline sub-sampling pattern is used to generate the predetermined sub-sampling pattern, a spatially-variable sub-sampling can be accurately and requisitely performed across the second region. In an example, when the sub-sampling density is 25 percent near the outer periphery of the second region, the baseline sub-sampling pattern indicates four pixels to be read out from amongst every 16 pixels (of a 4×4 grid) of the second region, wherein two out of the four pixels correspond to the green colour filters, one out of the four pixels corresponds to the red colour filters, and one out of the four pixels corresponds to the blue colour filters. When the sub-sampling density is 50 percent near the inner periphery of the second region, the baseline sub-sampling pattern indicates eight pixels to be read out from amongst every 16 pixels (of the 4×4 grid) of the second region, wherein four out of the eight pixels correspond to the green colour filters, two out of the eight pixels correspond to the red colour filters, and two out of the eight pixels correspond to the blue colour filters.

Referring to and continuing from the first example, the 8×8 sub-sampling pattern may be repeated 375000 times in an annular manner across both horizontal and vertical dimensions to form the baseline sub-sampling pattern, wherein an outer horizontal dimension, an outer vertical dimension, an inner horizontal dimension, and an inner vertical dimension of the baseline sub-sampling pattern may be equal to 5000 pixels, 5000 pixels, 1000 pixels, and 1000 pixels, respectively. The baseline sub-sampling pattern may have a sampling density equal to 25 percent. When the predetermined sub-sampling pattern is generated from the baseline sub-sampling pattern, a sub-sampling density near the outer periphery of the second region may be 25 percent, and a required number of additional pixels per unit area may be included in the baseline set of the baseline sub-sampling pattern to achieve a sub-sampling density of 50 percent near the inner periphery of the second region.

Optionally, the processor is configured to:
- identify at least one salient feature in at least one previously-generated image frame; and
- determine a given pixel in the second region that represents a part of the at least one salient feature in the at least one previously-generated image frame as an additional pixel to be read out.

The term "salient feature" refers to a feature in a given image frame that is visually alluring (namely, has high saliency). Examples of the at least one salient feature may include, but are not limited to, an edge, a corner, a high-frequency texture detail. Optionally, when identifying the at least one salient feature in the at least one previously-generated image frame, the processor is configured to employ at least one feature-extraction algorithm. Examples of the at least one feature extraction algorithm include, but are not limited to, an edge-detection algorithm (for example, such as a biased Sobel gradient estimator, a Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a feature descriptor algorithm (for example, such as Binary Robust Independent Elementary Features (BRIEF), Gradient Location and Orientation Histogram (GLOH), Histogram of Oriented Gradients (HOG), and the like), and a feature detector algorithm (for example, such as Scale-Invariant Feature Transform (SIFT), Oriented FAST and rotated BRIEF (ORB), Speeded Up Robust Features (SURF), and the like).

It will be appreciated that since the at least one salient feature is visually alluring, the user is more likely to focus on the at least one salient feature as compared to other features in the at least one image frame (that is subsequently generated after the at least one previously-generated image frame). Therefore, the at least one salient feature should be represented with high visual quality in the at least one image frame. For example, the user is more likely to focus on edges, corners, or high-frequency texture details as compared to interior features, blobs, or low-frequency texture details, since the former types of features are more visually alluring as compared to the latter. Therefore, the given pixel is read out to obtain accurate pixel data for the part of the at least one salient feature so as to obtain a high visual quality of the at least one salient feature in the at least one image frame. Furthermore, when the given pixel is read out, interpolation filtering is performed along the at least one salient feature, but not across it. Beneficially, in such a case, when demosaicking is subsequently performed after the interpolation filtering, undesirable visual artifacts (such as colour bleeding) in the at least one image frame are prevented, which otherwise would have been noticeable to the user when the user would have viewed the at least one salient feature in the at least one image frame.

Notably, the processor selectively reads out pixel data from the pixels of the second region. In particular, the processor reads out the second pixel data from the pixels of the selected set, instead of reading out pixel data from all pixels of the second region. It will be appreciated that such a selective read out of the pixel data facilitates in providing a high frame rate of image frames. The frame rate is expressed in terms of frames per second (FPS), and may, for example, be 60 FPS, 90 FPS, 120 FPS, or higher. This is because a processing time for selectively reading out the pixel data from the pixels of the second region and generating the pixel data of the remaining pixels of the second region from the second pixel data, is considerably lesser than a processing time for reading out the pixel data from each pixel of the second region. Therefore, in a given time duration, a higher number of image frames could be generated and displayed when the pixel data from the pixels of the second region is selectively read out, as compared to when the pixel data from all pixels of the second region is read out.

Notably, the pixel data of the remaining pixels (i.e., pixels excluded from the set of pixels) of the second region is generated using the second pixel data. Optionally, the processor is configured to generate the pixel data of the remaining pixels of the second region by performing at least one of: interpolation filtering, in-painting. In this way, the pixel data of the remaining pixels of the second region is accurately generated by performing the interpolation filtering and/or the in-painting on the second pixel data (which may be in the form of the RAW image data or the given colour space data), whilst also achieving a spatially-variable resolution in the at least one image frame, and a high frame rate of the image frames. The spatially-variable resolution is achieved by full sampling of the first region and sub-sampling of the second region, as described earlier. The "interpolation filtering" and "in-painting" are specialized processes of reconstructing damaged, missing, or un-read pixel data of some pixels by using pixel data read out from other pixels. The interpolation filtering and the in-painting are well-known in the art.

Optionally, the processor is configured to perform the interpolation filtering by employing at least one interpolation filtering algorithm. Optionally, the at least one interpolation filtering algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. Some interpolation filtering algorithms that are used in the demosaicking process may also be used to perform the interpolation filtering. The LCR algorithm may be used for generating a red colour value and/or a blue colour value in the pixel data of the remaining pixels of the second region. It will be appreciated that the edge-directed weighted-sum interpolation algorithm takes into account edge behaviours around the remaining pixels of the second region whose pixel data is to be generated by employing said algorithm. One such algorithm is described, for example, in "*Digital Camera Zooming Based on Unified CFA Image Processing Steps*" by R. Lukac, K. Martin, and K. N. Plataniotis, published in IEEE Transactions on Consumer Electronics, Vol. 50, No. 1, pp. 15-24, February 2004, which has been incorporated herein by reference.

Optionally, the processor is configured to perform the in-painting by employing at least one in-painting algorithm. Optionally, the at least one in-painting algorithm is at least one of: a Rapid Frequency Selective Reconstruction (FSR) algorithm, a Fast Marching Method (FMM) algorithm, a Navier Stokes (NS)-based in-painting algorithm, a coherence transport-based in-painting algorithm, an exemplar-based in-painting algorithm, a Criminisi's algorithm, a group-based sparse representation (GSR) algorithm, a compression-oriented edge-based in-painting algorithm, an annihilating filter-based low-rank Hankel matrix approach (ALOHA) algorithm, an image melding using patch-based synthesis algorithm.

Optionally, the processor is configured to perform at least one processing operation prior to or after generating the pixel data of remaining pixels of the second region from the second pixel data. In this regard, some processing operations may be performed prior to the generation of the pixel data of the remaining pixels, while other processing operations may be performed after the generation of the pixel data of the remaining pixels. Optionally, the at least one processing operation is at least one of: black level correction, defective pixel correction (DPC), Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, shot noise correction, chromatic aberration correction, reprojection.

In an exemplary implementation, the interpolation filtering is performed on the second pixel data prior to the demosaicking. In another exemplary implementation, the demosaicking and the interpolation filtering are combined as a single operation. In yet another exemplary implementation, the in-painting is performed on the second pixel data separately for each colour channel of a given colour space (such as for a red colour channel, a green colour channel, and a blue colour channel of the RGB colour space) after the demosaicking.

Typically, processing of the first pixel data, the second pixel data and the generated pixel data is performed, by the processor, in different steps. Optionally, when processing the first pixel data, the second pixel data and the generated pixel data to generate at least one image frame, the processor is configured to employ at least one image processing algorithm. Examples of the at least one image processing algorithm include, but are not limited to, an image denoising algorithm, an image sharpening algorithm, a colour conversion algorithm, and an auto white balancing algorithm. Different pixel data corresponding to different parts of the at least one image frame are processed by the processor in a manner that processor overburdening, delays, and excessive power consumption do not occur during said processing. In this regard, conservation and utilization of processing resources of the processor is optimized. An image quality of the at least one image frame so generated emulates image viewing quality and characteristics of human visual system. In particular, the at least one image frame has the spatially variable resolution, wherein a first portion of the at least one image frame corresponding to the first region has a first resolution that is higher than a second resolution of a second portion of the at least one image frame corresponding to the second region. Optionally, the first resolution is greater than or equal to 30 pixels per degree (PPD), whereas the second resolution is greater than or equal to 10 PPD. As an example, the first resolution may be 60 PPD, whereas the second resolution varies spatially within a range of 15 PPD (at an outer periphery of the second portion) to 30 PPD (at an inner periphery of the second portion).

Notably, the at least one image frame is displayed via the light source of the display apparatus. Herein, the term "light source" refers to an element from which light emanates. Optionally, a given light source is implemented as a display. In this regard, a given image frame is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given image frame is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. Optionally, the given light source is a single-resolution light source or a multi-resolution light source.

Optionally, the processor is configured to:
obtain information indicative of a head pose of the user;
detect whether or not a change in the head pose of the user is greater than a predefined angle within a predefined time period;
when it is detected that the change in the head pose is greater than the predefined angle within the predefined time period, employ a first sub-sampling pattern whose maximum sub-sampling density is equal to a first sub-sampling density as the predetermined sub-sampling pattern; and
when it is detected that the change in the head pose is not greater than the predefined angle within the predefined time period, employ a second sub-sampling pattern whose maximum sub-sampling density is equal to a second sub-sampling density as the predetermined sub-sampling pattern, wherein the second sub-sampling density is higher than the first sub-sampling density.

Optionally, the processor obtains the information indicative of the head pose of the user from a pose-tracking means of the display apparatus. The term "pose-tracking means" refers to specialized equipment that is employed to detect and/or follow a head pose of the user within the real-world environment, when the user wears the display apparatus on his/her head. The term "pose" encompasses both position and orientation. In practice, the pose-tracking means is actually employed to track a pose of the HMD; the head pose of the user corresponds to the pose of the HMD as the HMD is worn by the user on his/her head. Pursuant to embodiments of the present disclosure, the pose-tracking means is implemented as a true six Degrees of Freedom (6DoF) tracking system. In other words, the pose-tracking means tracks the pose of the user's head within a 3D space of the real-world environment, wherein pose-tracking data constitutes the information indicative of the head pose of the user. In particular, said pose-tracking means is configured to track translational movements (namely, surge, heave and sway movements) and rotational movements (namely, roll, pitch and yaw movements) of the user's head within the 3D space.

The pose-tracking means could be implemented as an internal component of the HMD, as a tracking system external to the HMD, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Optionally, a given processor employs at least one data processing algorithm to process the pose-tracking data, to determine a head pose of the user. The pose-tracking data may be in form of images, IMU/TIMU values, motion sensor data values, magnetic field strength values, or similar. Correspondingly, requisite data processing algorithm(s) is/are employed to process the pose-tracking data, to determine the head pose of the user. Examples of the at least one data processing algorithm include a feature detection algorithm, an environment mapping algorithm, a data extrapolation algorithm, and the like.

Optionally, the predefined angle within the predefined time period lies in a range of 10 degrees within the predefined time period to 150 degrees within the predefined time period. Optionally, the predefined time period lies in a range of 50 milliseconds to 700 milliseconds. As an example, the predefined angle within the predefined time period may be 30 degrees within 500 milliseconds, 20 degrees within 150 milliseconds, or similar.

In one case, when it is detected that the change in the head pose is greater than the predefined angle within the predefined time period, the user's head is moving rapidly, it may be determined that the user would perceive a low visual quality in the non-gaze-contingent pixels of the at least one image frame. Therefore, pixel data from the pixels lying in the second region is selectively read out according to the first sub-sampling pattern. In such a case, the first sub-sampling density enables in achieving the (required) low visual quality in the non-gaze-contingent pixels of the at least one image frame.

In another case, when it is detected that the change in the head pose is not greater than the predefined angle within the predefined time period, the user's head is moving slowly as the user may be concentrating on a certain region in the visual scene. In such a case, it may be determined that the user would be able to perceive considerable visual quality in the non-gaze-contingent pixels of the at least one image frame. Therefore, pixel data from the pixels lying in the second region is selectively read out according to the second sub-sampling pattern whose second sub-sampling density is higher than the first sub-sampling density. As a result, a relatively higher visual quality is achieved in the non-gaze-contingent pixels of the at least one image frame as compared to when the first sub-sampling density is employed.

Optionally, when it is detected that the change in the head pose is greater than the predefined angle within the predefined time period, the processor is configured to:
select a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;
read out only a portion of the first pixel data from the pixels of the selected set, instead of an entirety of the first pixel data; and
generate, from said portion of the first pixel data, a remaining portion of the first pixel data.

In this regard, the pixels lying in the first region are sub-sampled (according to the third sub-sampling pattern). The sub-sampling would reduce visual quality of the gaze-contingent pixels of the at least one image frame, but such a reduction in the visual quality would not be perceivable by the user as the user's head is moving very fast. Therefore, the user's viewing experience would not be compromised, but processing resource savings would be achieved. It will be appreciated that the subsampling in the first region enables in optimizing utilization of processing resources and reducing processing time of the processor. This is because the processing resources and the processing time required in reading out the portion of the first pixel data are considerably less as compared to those that are required when the entirety of the first pixel data is read. Optionally, the processor is configured to generate the remaining portion of the first pixel data from the portion of the first pixel data, by performing at least one of: interpolation filtering, in-painting.

The present disclosure also relates to the display apparatus as described above. Various embodiments and variants disclosed above apply mutatis mutandis to the display apparatus.

Optionally, in the display apparatus, the predetermined sub-sampling pattern is a non-regular pattern.

Optionally, in the display apparatus, the at least one processor is configured to change the predetermined sub-sampling pattern from one image frame to another image frame.

Optionally, in the display apparatus, a sub-sampling density of the predetermined sub-sampling pattern varies across the second region as a function of a distance from the gaze position.

Optionally, in the display apparatus, the at least one processor is configured to generate the predetermined sub-sampling pattern from a baseline sub-sampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from an outer periphery of the second region towards an inner periphery of the second region according to the function of the distance from the gaze position.

Optionally, in the display apparatus, the baseline sub-sampling pattern indicates locations of green pixels, red pixels and blue pixels that are to be read out, wherein the baseline set includes the green pixels, the red pixels and the blue pixels in a ratio of 2:1:1.

Optionally, in the display apparatus, the at least one processor is configured to:
identify at least one salient feature in at least one previously-generated image frame; and
determine a given pixel in the second region that represents a part of the at least one salient feature in the at least one previously-generated image frame as an additional pixel to be read out.

Optionally, the display apparatus further comprises pose-tracking means, wherein the at least one processor is configured to:
process pose-tracking data, collected by the pose-tracking means, to determine a head pose of the user;
detect whether or not a change in the head pose of the user is greater than a predefined angle within a predefined time period;
when it is detected that the change in the head pose is greater than the predefined angle within the predefined time period, employ a first sub-sampling pattern whose maximum sub-sampling density is equal to a first sub-sampling density as the predetermined sub-sampling pattern; and
when it is detected that the change in the head pose is not greater than the predefined angle within the predefined time period, employ a second sub-sampling pattern whose maximum sub-sampling density is equal to a second sub-sampling density as the predetermined sub-sampling pattern, wherein the second sub-sampling density is higher than the first sub-sampling density.

Optionally, in the display apparatus, when it is detected that the change in the head pose is greater than the predefined angle within the predefined time period, the at least one processor is configured to:
select a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;
read out only a portion of the first pixel data from the pixels of the selected set, instead of an entirety of the first pixel data; and
generate, from said portion of the first pixel data, a remaining portion of the first pixel data.

Optionally, in the display apparatus, the at least one processor is configured to generate the pixel data of the remaining pixels of the second region by performing at least one of: interpolation filtering, in-painting.

The present disclosure also relates to the method as described above. Various embodiments and variants disclosed above apply mutatis mutandis to the method.

Optionally, in the method, the predetermined sub-sampling pattern is a non-regular pattern.

Optionally, the method further comprises changing the predetermined sub-sampling pattern from one image frame to another image frame.

Optionally, in the method, a sub-sampling density of the predetermined sub-sampling pattern varies across the second region as a function of a distance from the gaze position.

Optionally, the method further comprises generating the predetermined sub-sampling pattern from a baseline subsampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from an outer periphery of the second region towards an inner periphery of the second region according to the function of the distance from the gaze position.

Optionally, in the method, the baseline sub-sampling pattern indicates locations of green pixels, red pixels and blue pixels that are to be read out, wherein the baseline set includes the green pixels, the red pixels and the blue pixels in a ratio of 2:1:1.

Optionally, the method further comprises:
identifying at least one salient feature in at least one previously-generated image frame; and
determining a given pixel in the second region that represents a part of the at least one salient feature in the at least one previously-generated image frame as an additional pixel to be read out.

Optionally, the method further comprises:
obtaining information indicative of a head pose of the user;
detecting whether or not a change in the head pose of the user is greater than a predefined angle within a predefined time period;
when it is detected that the change in the head pose is greater than the predefined angle within the predefined time period, employing a first sub-sampling pattern whose maximum sub-sampling density is equal to a first sub-sampling density as the predetermined sub-sampling pattern; and
when it is detected that the change in the head pose is not greater than the predefined angle within the predefined time period, employing a second sub-sampling pattern whose maximum sub-sampling density is equal to a second sub-sampling density as the predetermined sub-sampling pattern, wherein the second sub-sampling density is higher than the first sub-sampling density.

Optionally, when it is detected that the change in the head pose is greater than the predefined angle within the predefined time period, the method further comprises:
selecting a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;
reading out only a portion of the first pixel data from the pixels of the selected set, instead of an entirety of the first pixel data; and
generating, from said portion of the first pixel data, a remaining portion of the first pixel data.

Optionally, the method further comprises generating the pixel data of the remaining pixels of the second region by performing at least one of: interpolation filtering, in-painting.

DETAILED DESCRIPTION OF THE DRAWINGS

Referring to FIG. 1, illustrated is a block diagram of an architecture of an imaging system 100, in accordance with an embodiment of the present disclosure. The imaging system 100 comprises an image sensor 102 and a processor 104. The image sensor 102 comprises a plurality of pixels (not shown) arranged on a photo-sensitive surface thereof. The processor 104 is coupled to the image sensor 102.

Figure 2A:
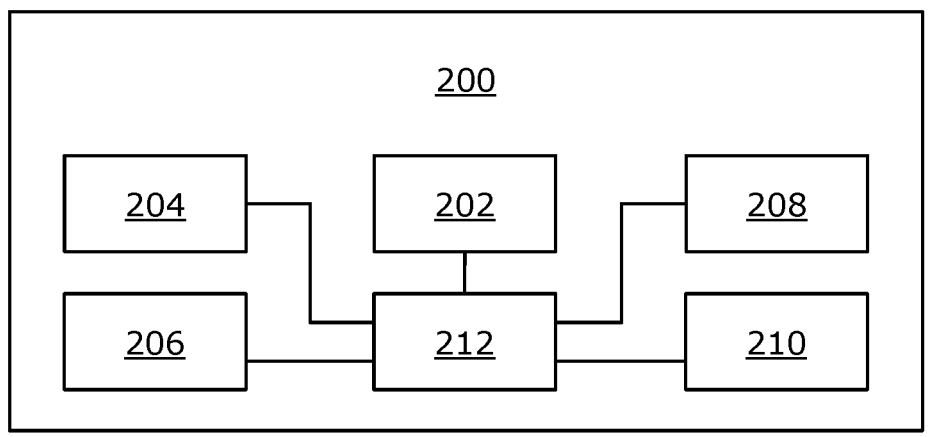
FIGS. 2A and 2B illustrate block diagrams of architectures of a display apparatus, in accordance with different embodiments of the present disclosure.
Figure 2B:
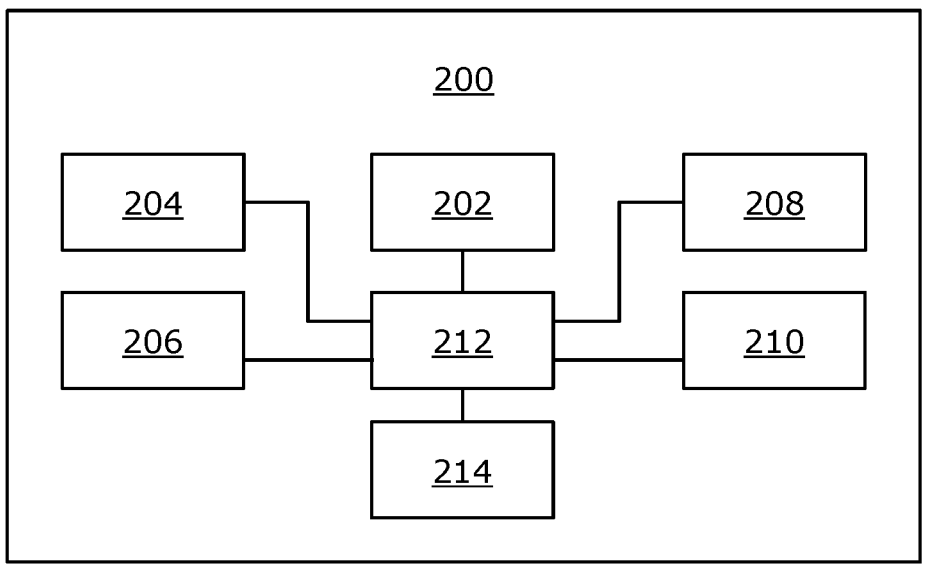

Referring to FIGS. 2A and 2B, illustrated are block diagrams of architectures of a display apparatus 200, in accordance with different embodiments of the present disclosure. The display apparatus 200 comprises a gaze-tracking means 202, a light source per eye (depicted as a light source 204 corresponding to a left eye and a light source 206 corresponding to a right eye), an image sensor per eye (depicted as an image sensor 208 corresponding to the left eye and an image sensor 210 corresponding to the right eye), and at least one processor (depicted as a processor 212). The processor 212 is coupled to the gaze-tracking means 202, the light sources 204 and 206, and the image sensors 208 and 210. In FIG. 2B, the display apparatus 200 further comprises pose-tracking means 214. The processor 212 is also coupled to the pose-tracking means 214.

Figure 3A:
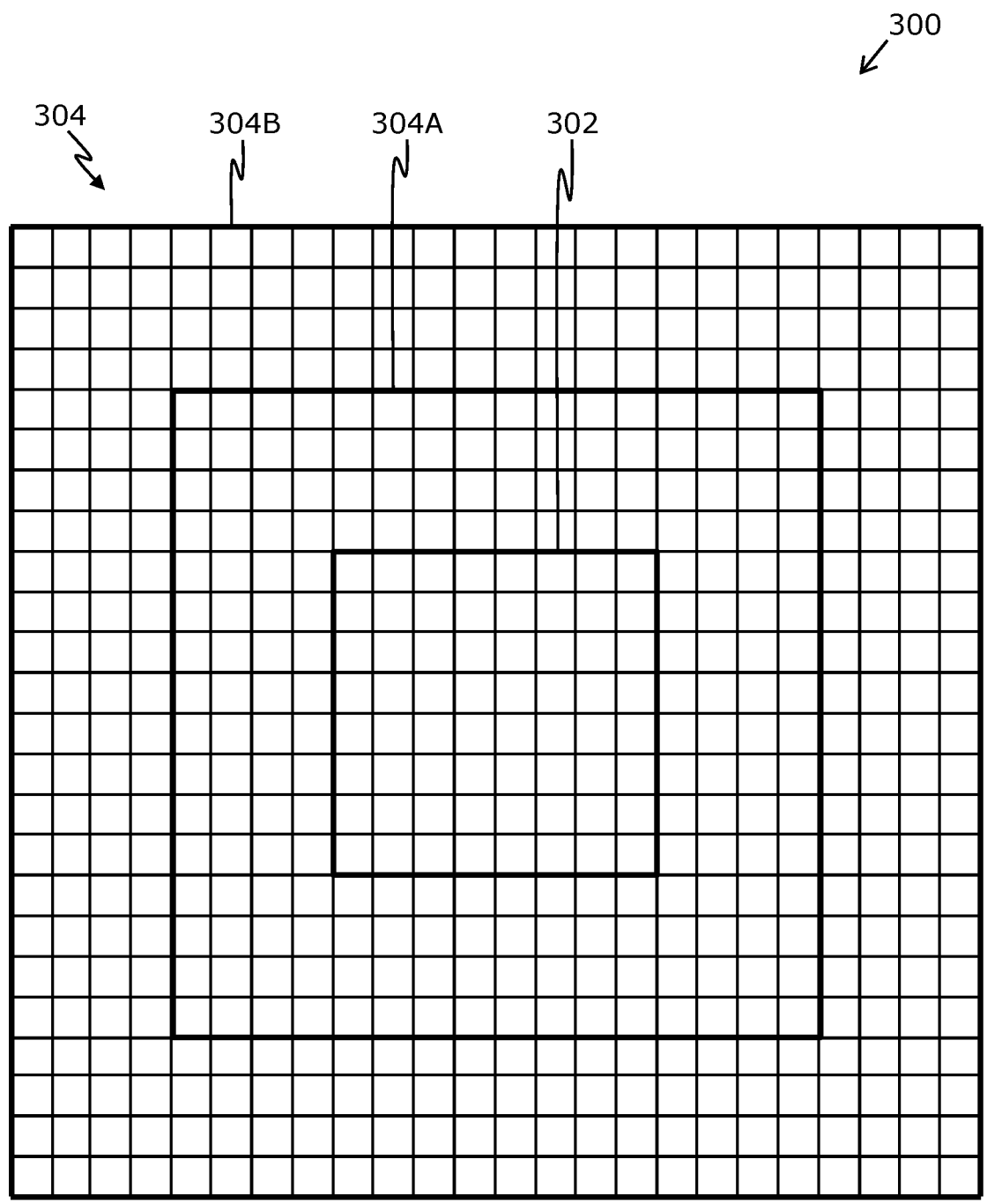
Figure 3B:
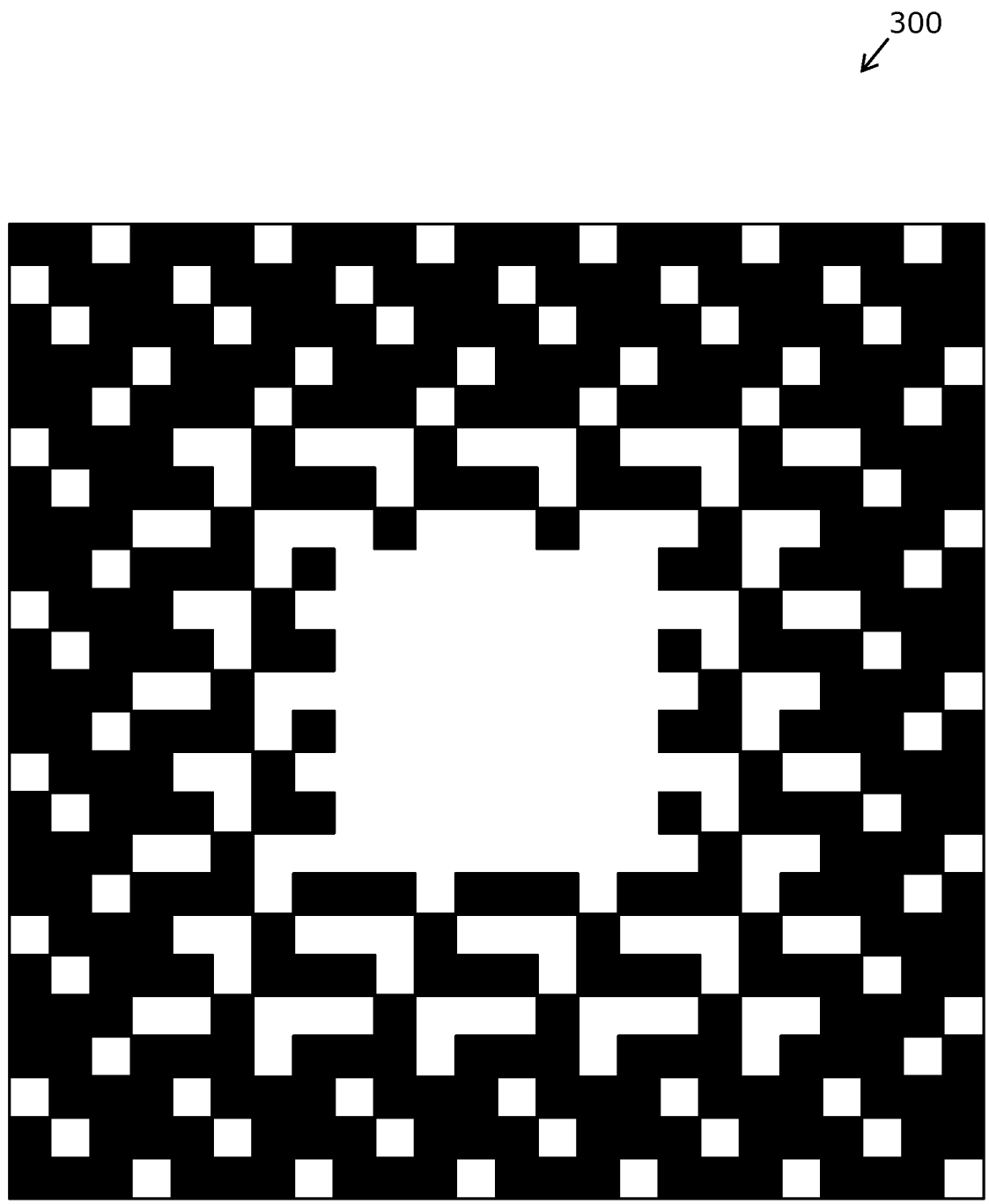
FIG. 3B illustrates how pixels arranged on the photo-sensitive surface are read out, in accordance with an embodiment of the present disclosure.

Referring to FIGS. 3A and 3B, FIG. 3A illustrates different regions on a photo-sensitive surface 300 of an image sensor, while FIG. 3B illustrates how pixels arranged on the photo-sensitive surface 300 are read out, in accordance with an embodiment of the present disclosure. In FIG. 3A, the photo-sensitive surface 300 is shown to comprise 576 pixels arranged in a 24×24 grid, for the sake of simplicity and clarity only. It will be appreciated that a photo-sensitive surface of a typical image sensor has millions of pixels. The photo-sensitive surface 300 has a first region 302 and a second region 304 that are determined based on a gaze position (for example, at a centre of the photo-sensitive surface 300). The first region 302 includes and surrounds the gaze position and is shown as an 8×8 grid of 64 pixels. The second region 304 surrounds the first region 302 and is shown to include 512 pixels. The second region 304 includes a first sub-region 304A and a second sub-region 304B, wherein the first sub-region 304A lies between the second sub-region 304B and the first region 302. The first sub-region 304A is shown to include 192 pixels and the second sub-region 304B is shown to include 320 pixels.

In FIG. 3B, white pixels illustrate pixels that are read out whereas blackened pixels illustrate pixels that are not read out. Notably, each pixel of the first region 302 is read out to constitute first pixel data, whereas only a set of pixels are read out from the second region 304 to constitute second pixel data. The set of pixels are selected based on a predetermined sub-sampling pattern. A sampling density across the first region 302 is 100 percent (i.e., all 64 pixels in the first region 302 are read out). A sub-sampling density of the predetermined sub-sampling pattern varies across the second region 304 as a function of a distance from the gaze position. For example, a sub-sampling density in the first sub-region 304A is 50 percent (i.e., half of the 192 pixels in the first sub-region 304A are read out), while a sub-sampling density in the second sub-region 304B is 25 percent (i.e., a quarter of the 320 pixels in the second sub-region 304B are read out).

FIGS. 3A and 3B are merely examples, which should not unduly limit the scope of the claims herein. A person skilled in the art will recognize many variations, alternatives, and modifications of embodiments of the present disclosure. In an example, photo-sensitive surface 300 may comprise 25 megapixels arranged in a 5000×5000 grid.

Figure 4:
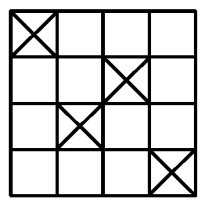
FIG. 4 illustrates a manner in which a predetermined sub-sampling pattern changes across eight image frames, in accordance with an embodiment of the present disclosure.
Figure 4:
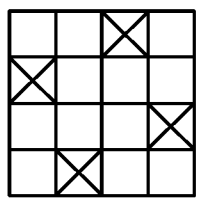
Figure 4:
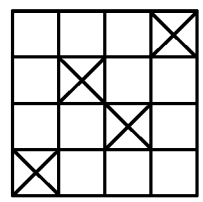
Figure 4:
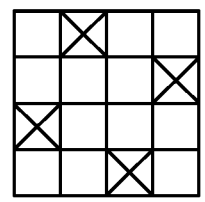
Figure 4:
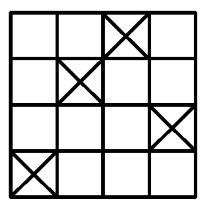
Figure 4:
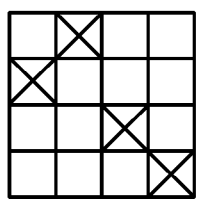
Figure 4:
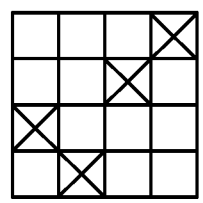
Figure 4:
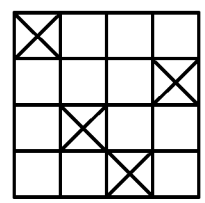

Referring to FIG. 4, illustrated is a manner in which a predetermined sub-sampling pattern changes across eight image frames, in accordance with an embodiment of the present disclosure. The predetermined sub-sampling pattern is a non-regular pattern. For sake of simplicity, only a portion of the predetermined sub-sampling pattern corresponding to a 4×4 grid of pixels of the second region is depicted in FIG. 4. Various forms of the portion of the predetermined sub-sampling pattern corresponding to the eight image frames are represented as P1, P2, P3, P4, P5, P6, P7, and P8. A sub-sampling density of the portion of the predetermined sub-sampling pattern is shown to be 25 percent (i.e., only pixels that are crossed out as 'X' are read out while other pixels are not read out).

Figure 5:
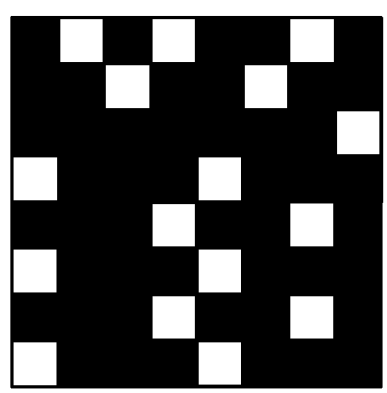
FIG. 5 illustrates a sub-sampling pattern that is used to generate a baseline sub-sampling pattern, in accordance with an embodiment of the present disclosure.

Referring to FIG. 5, illustrated is a sub-sampling pattern 500 that is used to generate a baseline sub-sampling pattern (not shown), in accordance with an embodiment of the present disclosure. The sub-sampling pattern 500 is an 8×8 sub-sampling pattern having a sub-sampling density of 25 percent (i.e., only 16 pixels depicted as white pixels are read out while remaining 48 pixels depicted as blackened pixels are not read out). The baseline sub-sampling pattern of a requisite size could be generated by repeating the sub-sampling pattern 500, in at least one given direction. Notably, the baseline sub-sampling pattern is used to generate a predetermined sub-sampling pattern.

Referring to FIGS. 6A, 6B, 6C, and 6D, illustrated is a manner in which pixel data of remaining pixels of a portion 600 of a second region on a photo-sensitive surface (not shown) is generated, in accordance with an embodiment of the the present disclosure. The portion 600 of the second region is shown to include 64 pixels arranged in an 8×8 grid, for the sake of simplicity. In FIGS. 6A-6D, pixel data of the remaining pixels of the portion 600 is shown, for example, to be generated by performing interpolation filtering.

Figure 6A:
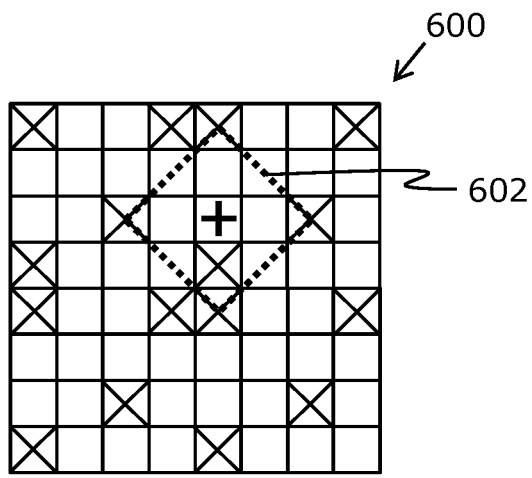
FIGS. 6A, 6B, 6C, and 6D illustrate a manner in which pixel data of remaining to pixels of a portion of a second region on a photo-sensitive surface is generated, in accordance with an embodiment of the present disclosure.
Figure 6B:
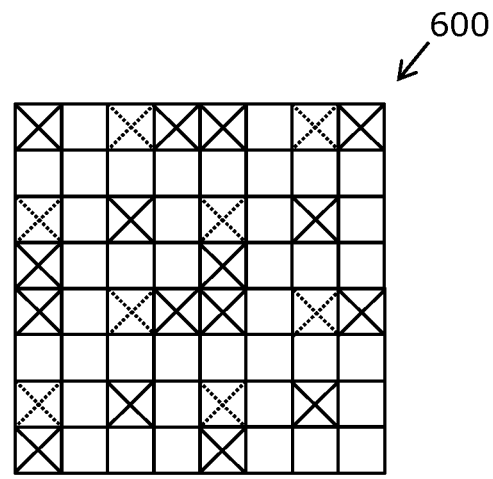
Figure 6C:
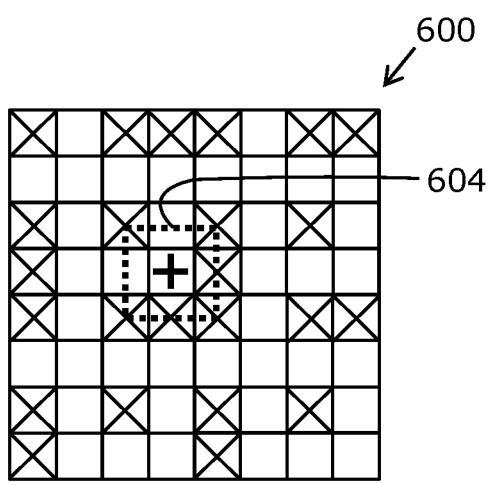
Figure 6D:
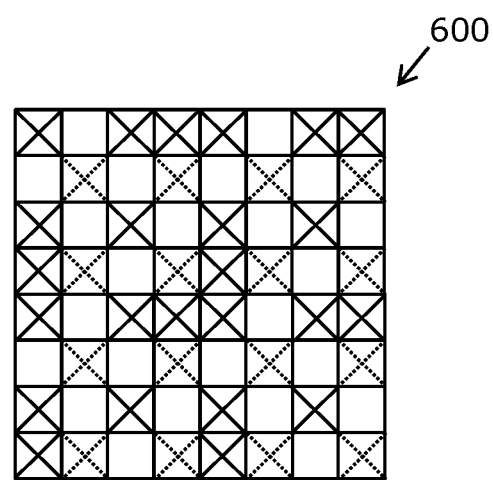

In FIG. 6A, pixels that are read out from the portion 600 of the second region are shown as 16 pixels that are crossed out as solid 'X's. A diamond pattern 602 is employed for generating pixel data, wherein pixel data of pixels at corners of the diamond pattern 602 is used to generate pixel data of a pixel (labelled as '+') lying in a centre of the diamond pattern 602. The diamond pattern 602 is moved across the portion 600, to generate pixel data of at least one pixel in the portion 600. In FIG. 6B, there are shown 8 pixels (crossed out as dotted 'X's) for which pixel data is generated using the diamond pattern 602. Next, in FIG. 6C, pixels for which pixel data is available are shown as 24 pixels that are crossed out as solid 'X's. A square pattern 604 is employed for generating pixel data, wherein pixel data of pixels at corners of the square pattern 604 is used to generate pixel data of a pixel (labelled as '+') lying in a centre of the square pattern 604. The square pattern 604 is moved across the portion 600, to generate pixel data of at least one pixel in the portion 600. In FIG. 6D, there are shown 16 pixels (crossed out as dotted 'X's) for which pixel data is generated using the square pattern 604. It will be appreciated that apart from using the diamond pattern and the square pattern as described hereinabove, when a remaining pixel (of the portion 600) lies diagonally in between two pixels that are read out from the portion 600, pixel data of the remaining pixel could be generated by averaging pixel data of the two pixels that are read out from the portion 600, or by performing the linear interpolation filtering on the pixel data of said two pixels.

It may be understood by a person skilled in the art that the FIGS. 6A, 6B, 6C, and 6D are merely examples for sake of clarity, which should not unduly limit the scope of the claims herein. The person skilled in the art will recognize many variations, alternatives, and modifications of embodiments of the present disclosure.

Figure 7A:
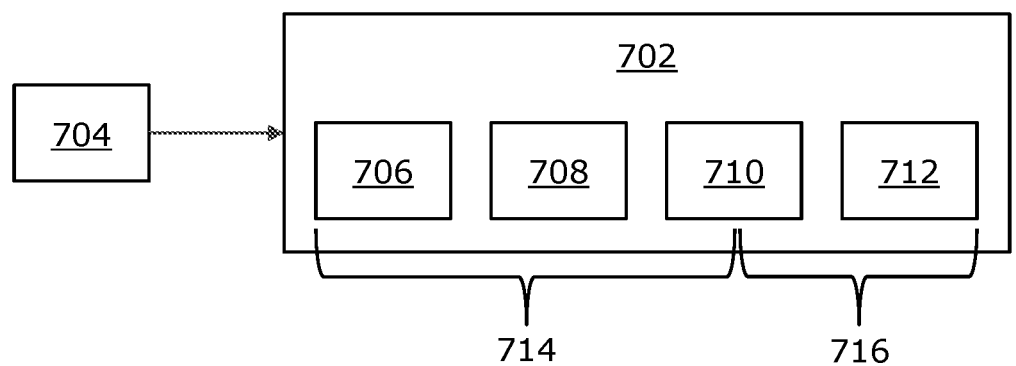
FIGS. 7A and 7B illustrate a processing pipeline indicating where generation of pixel data of remaining pixels of a second region is performed, in accordance with different embodiments of the present disclosure.
Figure 7B:
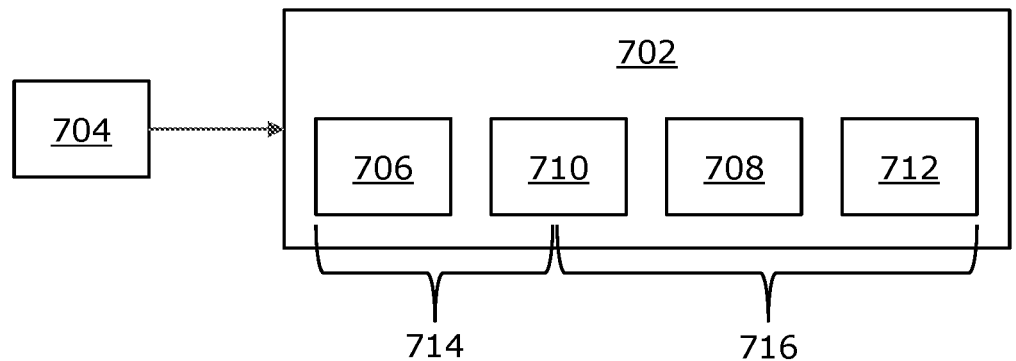

Referring to FIGS. 7A and 7B, illustrated is a processing pipeline indicating where generation of pixel data of remaining pixels of a second region is performed, in accordance with different embodiments of the present disclosure. The processing pipeline is implemented by a processor 702 that is coupled to an image sensor 704, wherein the image sensor 704 comprises a plurality of pixels arranged on a photo-sensitive surface thereof. The processor 702 is implemented, for example, as an image signal processor. The processing pipeline includes several processing operations (depicted, for example, as processing operations 706, 708, 710, and 712). For example, the processing operation 706 is black level correction and shading correction, the processing operation 708 is the generation of pixel data of remaining pixels of the second region, the processing operation 710 is demosaicking, and the processing operation 712 is at least one image enhancement operation. Some of the several processing operations are performed in a RAW domain 714, while others are performed in a colour domain 716. The colour domain 716 may, for example, be a Red Green Blue (RGB) domain. In FIG. 7A, the generation of pixel data of remaining pixels of the second region (i.e., the processing operation 708) is performed in the RAW domain 714. In FIG. 7B, the generation of pixel data of remaining pixels of the second region (i.e., the processing operation 708) is performed in the colour domain 716.

It may be understood by a person skilled in the art that the FIGS. 7A and 7B are merely examples for sake of clarity, which should not unduly limit the scope of the claims herein. The person skilled in the art will recognize many variations, alternatives, and modifications of embodiments of the present disclosure. For example, the processing pipeline may include several other processing operations, for example, defective pixel correction (DPC), Bayer domain denoising, lens shading correction, scaling, automatic white balance gain adjustment, and the like.

Figure 8A:
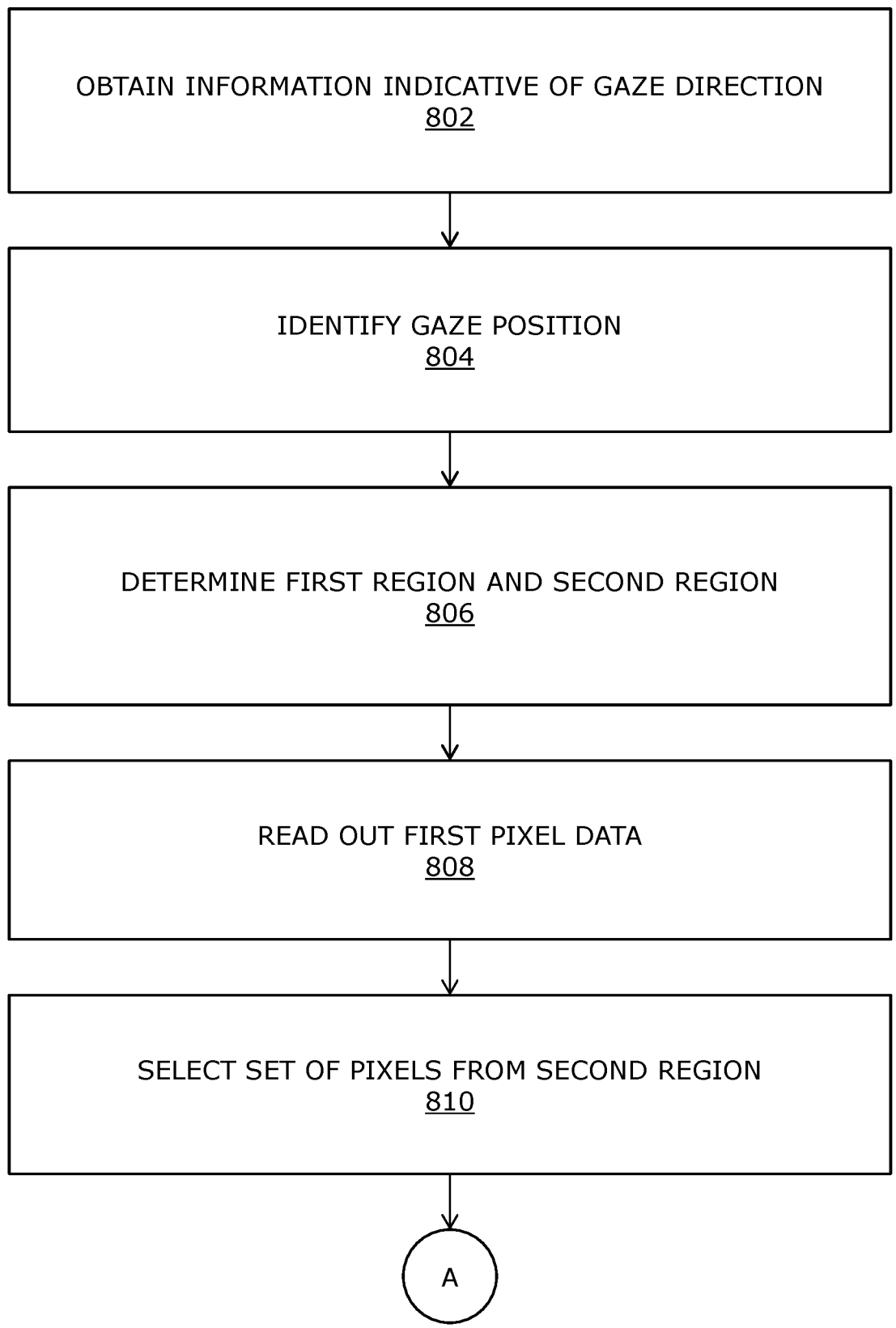
FIGS. 8A and 8B illustrate steps of a method, in accordance with an embodiment of the present disclosure.
Figure 8B:
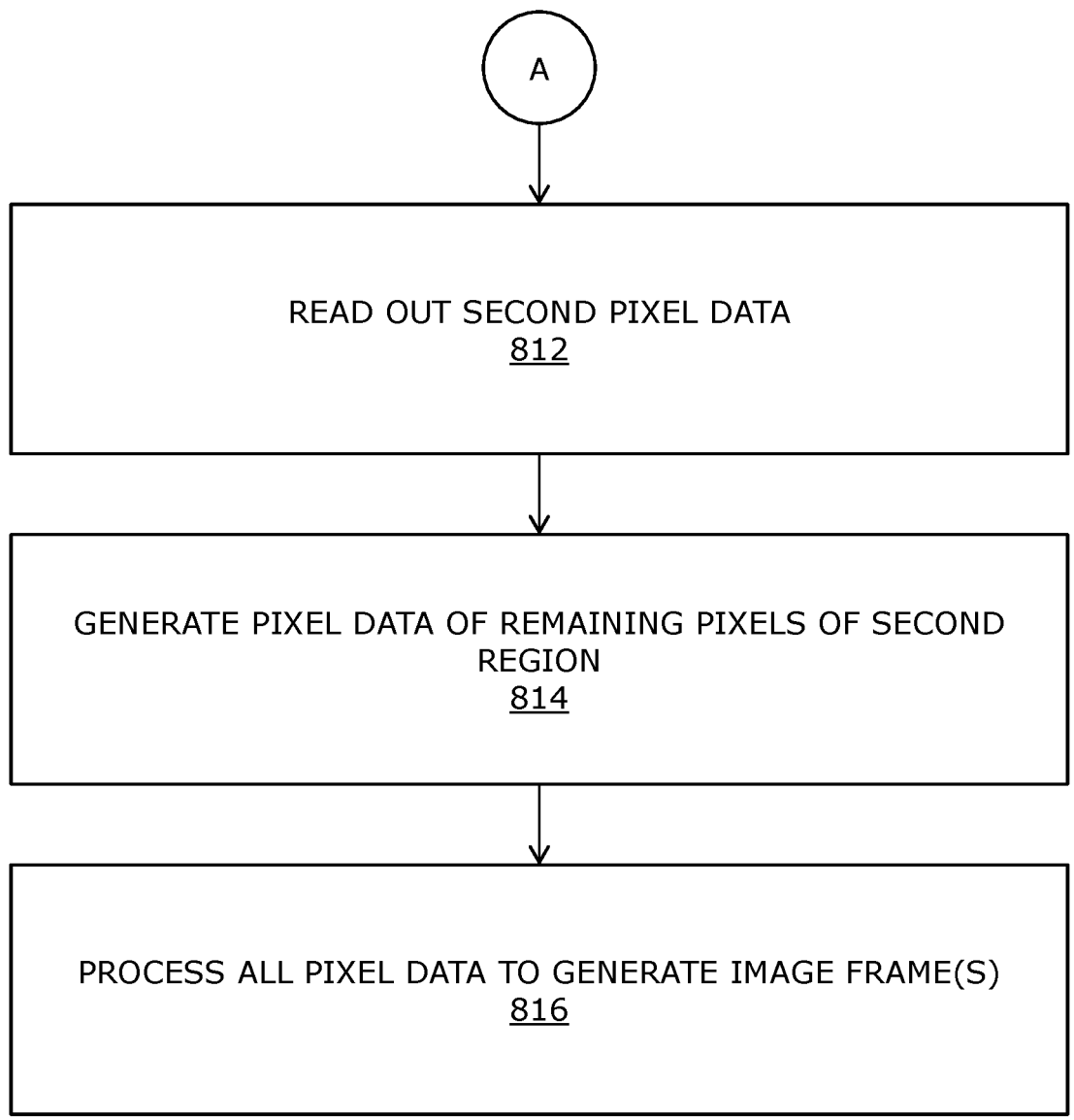

Referring to FIGS. 8A and 8B, illustrated are steps of a method, in accordance with an embodiment of the present disclosure. At step 802, information indicative of a gaze direction of a user's eye is obtained. At step 804, a gaze position on a photo-sensitive surface of an image sensor is identified based on the gaze direction of the user's eye. At step 806, a first region and a second region are determined on the photo-sensitive surface of the image sensor based on the gaze position, wherein the first region includes and surrounds the gaze position while the second region surrounds the first region. At step 808, first pixel data is read out from each pixel of the first region. At step 810, a set of pixels that are to be read out from the second region are selected based on a predetermined sub-sampling pattern, wherein the predetermined sub-sampling pattern indicates locations of the pixels of the set. At step 812, second pixel data is read out from the pixels of the selected set. At step 814, pixel data of remaining pixels of the second region is generated from the second pixel data. At step 816, the first pixel data, the second pixel data and the generated pixel data are processed to generate at least one image frame.

The steps 802, 804, 806, 808, 810, 812, 814, and 816 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging system comprising:
an image sensor comprising a plurality of pixels arranged on a photo-sensitive surface thereof; and
a processor configured to:
obtain information indicative of a gaze direction of a user's eye;
identify a gaze position on the photo-sensitive surface of the image sensor, based on the gaze direction of the user's eye;
determine a first region and a second region on the photo-sensitive surface of the image sensor based on the gaze position, wherein the first region includes and surrounds the gaze position, while the second region surrounds the first region;
read out first pixel data from each pixel of the first region;
select a set of pixels that are to be read out from the second region based on a predetermined spatially irregular sub-sampling pattern, wherein the predetermined sub-sampling pattern indicates locations of the pixels of the set;
read out second pixel data from the pixels of the selected set;
generate, from the second pixel data, pixel data of remaining pixels of the second region; and
process the first pixel data, the second pixel data and the generated pixel data to generate at least one image frame.

2. The imaging system of claim 1, wherein the predetermined sub-sampling pattern is a non-regular pattern.

3. The imaging system of claim 1, wherein the processor is configured to change the predetermined sub-sampling pattern from one image frame to another image frame.

4. The imaging system of claim 1, wherein a sub-sampling density of the predetermined sub-sampling pattern varies across the second region as a function of a distance from the gaze position.

5. The imaging system of claim 4, wherein the sub-sampling density is at least 25 percent.

6. The imaging system of claim 4, wherein the processor is configured to generate the predetermined sub-sampling pattern from a baseline sub-sampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from an outer periphery of the second region towards an inner periphery of the second region according to the function of the distance from the gaze position.

7. The imaging system of claim 6, wherein the baseline sub-sampling pattern indicates locations of green pixels, red pixels and blue pixels that are to be read out, wherein the baseline set includes the green pixels, the red pixels and the blue pixels in a ratio of 2:1:1.

8. The imaging system of claim 6, wherein the processor is configured to:
identify at least one salient feature in at least one previously-generated image frame; and
determine a given pixel in the second region that represents a part of the at least one salient feature in the at least one previously-generated image frame as an additional pixel to be read out.

9. The imaging system of claim 1, wherein the processor is configured to:
obtain information indicative of a head pose of the user;
detect whether or not a change in the head pose of the user is greater than a predefined angle within a predefined time period;
when it is detected that the change in the head pose is greater than the predefined angle within the predefined time period, employ a first sub-sampling pattern whose maximum sub-sampling density is equal to a first sub-sampling density as the predetermined sub-sampling pattern; and
when it is detected that the change in the head pose is not greater than the predefined angle within the predefined time period, employ a second sub-sampling pattern whose maximum sub-sampling density is equal to a second sub-sampling density as the predetermined sub-sampling pattern, wherein the second sub-sampling density is higher than the first sub-sampling density.

10. The imaging system of claim 9, wherein when it is detected that the change in the head pose is greater than the predefined angle within the predefined time period, the processor is configured to:
select a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;
read out only a portion of the first pixel data from the pixels of the selected set, instead of an entirety of the first pixel data; and
generate, from said portion of the first pixel data, a remaining portion of the first pixel data.

11. The imaging system of claim 1, wherein the processor is configured to generate the pixel data of the remaining pixels of the second region by performing at least one of: interpolation filtering, in-painting.

12. A display apparatus comprising:
gaze-tracking means;
a light source per eye;
an image sensor per eye comprising a plurality of pixels arranged on a photo-sensitive surface thereof; and
at least one processor configured to:
process gaze-tracking data, collected by the gaze-tracking means, to determine a gaze direction of a user's eye;
identify a gaze position on the photo-sensitive surface of the image sensor, based on the gaze direction of the user's eye;
determine a first region and a second region on the photo-sensitive surface of the image sensor based on the gaze position, wherein the first region includes and surrounds the gaze position, while the second region surrounds the first region;
read out first pixel data from each pixel of the first region;
select a set of pixels that are to be read out from the second region based on a predetermined spatially irregular sub-sampling pattern, wherein the predetermined sub-sampling pattern indicates locations of the pixels of the set;

read out second pixel data from the pixels of the selected set;

generate, from the second pixel data, pixel data of remaining pixels of the second region;

process the first pixel data, the second pixel data and the generated pixel data to generate at least one image frame; and display the at least one image frame via the light source.

13. The display apparatus of claim 12, wherein the predetermined sub-sampling pattern is a non-regular pattern.

14. The display apparatus of claim 12, wherein the at least one processor is configured to change the predetermined sub-sampling pattern from one image frame to another image frame.

15. The display apparatus of claim 12, wherein a sub-sampling density of the predetermined sub-sampling pattern varies across the second region as a function of a distance from the gaze position.

16. The display apparatus of claim 15, wherein the at least one processor is configured to generate the predetermined sub-sampling pattern from a baseline sub-sampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from an outer periphery of the second region towards an inner periphery of the second region according to the function of the distance from the gaze position.

17. The display apparatus of claim 16, wherein the baseline sub-sampling pattern indicates locations of green pixels, red pixels and blue pixels that are to be read out, wherein the baseline set includes the green pixels, the red pixels and the blue pixels in a ratio of 2:1:1.

18. The display apparatus of claim 16, wherein the at least one processor is configured to:

identify at least one salient feature in at least one previously-generated image frame; and determine a given pixel in the second region that represents a part of the at least one salient feature in the at least one previously-generated image frame as an additional pixel to be read out.

19. The display apparatus of claim 12, further comprising pose-tracking means, wherein the at least one processor is configured to:

process pose-tracking data, collected by the pose-tracking means, to determine a head pose of the user;

detect whether or not a change in the head pose of the user is greater than a predefined angle within a predefined time period;

when it is detected that the change in the head pose is greater than the predefined angle within the predefined time period, employ a first sub-sampling pattern whose maximum sub-sampling density is equal to a first sub-sampling density as the predetermined sub-sampling pattern; and when it is detected that the change in the head pose is not greater than the predefined angle within the predefined time period, employ a second sub-sampling pattern whose maximum sub-sampling density is equal to a second sub-sampling density as the predetermined sub-sampling pattern, wherein the second sub-sampling density is higher than the first sub-sampling density.

20. The display apparatus of claim 19, wherein when it is detected that the change in the head pose is greater than the predefined angle within the predefined time period, the at least one processor is configured to:

select a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;

read out only a portion of the first pixel data from the pixels of the selected set, instead of an entirety of the first pixel data; and generate, from said portion of the first pixel data, a remaining portion of the first pixel data.

21. The display apparatus of claim 12, wherein the at least one processor is configured to generate the pixel data of the remaining pixels of the second region by performing at least one of: interpolation filtering, in-painting.

22. A method comprising:

obtaining information indicative of a gaze direction of a user's eye;

identifying a gaze position on a photo-sensitive surface of an image sensor, based on the gaze direction of the user's eye;

determining a first region and a second region on the photo-sensitive surface of the image sensor based on the gaze position, wherein the first region includes and surrounds the gaze position, while the second region surrounds the first region;

reading out first pixel data from each pixel of the first region;

selecting a set of pixels that are to be read out from the second region based on a predetermined spatially irregular sub-sampling pattern, wherein the predetermined sub-sampling pattern indicates locations of the pixels of the set;

reading out second pixel data from the pixels of the selected set;

generating, from the second pixel data, pixel data of remaining pixels of the second region; and processing the first pixel data, the second pixel data and the generated pixel data to generate at least one image frame.

23. The method of claim 22, wherein the predetermined sub-sampling pattern is a non-regular pattern.

24. The method of claim 22, further comprising changing the predetermined sub-sampling pattern from one image frame to another image frame.

25. The method of claim 22, wherein a sub-sampling density of the predetermined sub-sampling pattern varies across the second region as a function of a distance from the gaze position.

26. The method of claim 25, further comprising generating the predetermined sub-sampling pattern from a baseline sub-sampling pattern having a same sub-sampling density across the second region and indicating locations of pixels of a baseline set, by including additional pixels in the baseline set and indicating locations of the additional pixels, wherein a number of additional pixels to be included in the baseline set per unit area increases on going from an outer periphery of the second region towards an inner periphery of the second region according to the function of the distance from the gaze position.

27. The method of claim 26, wherein the baseline sub-sampling pattern indicates locations of green pixels, red pixels and blue pixels that are to be read out, wherein the baseline set includes the green pixels, the red pixels and the blue pixels in a ratio of 2:1:1.

28. The method of claim 26, further comprising:
identifying at least one salient feature in at least one previously-generated image frame; and
determining a given pixel in the second region that represents a part of the at least one salient feature in the at least one previously-generated image frame as an additional pixel to be read out.

29. The method of claim 22, further comprising:
obtaining information indicative of a head pose of the user;
detecting whether or not a change in the head pose of the user is greater than a predefined angle within a predefined time period;
when it is detected that the change in the head pose is greater than the predefined angle within the predefined time period, employing a first sub-sampling pattern whose maximum sub-sampling density is equal to a first sub-sampling density as the predetermined sub-sampling pattern; and
when it is detected that the change in the head pose is not greater than the predefined angle within the predefined time period, employing a second sub-sampling pattern whose maximum sub-sampling density is equal to a second sub-sampling density as the predetermined sub-sampling pattern, wherein the second sub-sampling density is higher than the first sub-sampling density.

30. The method of claim 29, wherein when it is detected that the change in the head pose is greater than the predefined angle within the predefined time period, the method further comprises:
selecting a set of pixels that are to be read out from the first region based on a third sub-sampling pattern having a third sub-sampling density, wherein the third sub-sampling pattern indicates locations of the pixels of the set, the third sub-sampling density being higher than the second sub-sampling density and the first sub-sampling density;
reading out only a portion of the first pixel data from the pixels of the selected set, instead of an entirety of the first pixel data; and
generating, from said portion of the first pixel data, a remaining portion of the first pixel data.

31. The method of claim 22, further comprising generating the pixel data of the remaining pixels of the second region by performing at least one of: interpolation filtering, in-painting.

* * * * *